June 14, 1927.

R. MATTICE

WELDING TOOL

Filed July 7, 1925

1,632,411

Inventor
Royal Mattice
By Donald U. Rich
Attorney

Patented June 14, 1927.

1,632,411

UNITED STATES PATENT OFFICE.

ROYAL MATTICE, OF BETHLEHEM, PENNSYLVANIA.

WELDING TOOL.

Application filed July 7, 1925. Serial No. 42,000.

This invention relates to welding tools for use in connection with electric arc welding, and contemplates, more particularly, the production of a safe, efficient, and durable tool in which the possibility of shock and excessive heating is reduced to a minimum, and the rapidity of conducting electric current to the electrode is materially increased.

The main object of the present invention is the provision of a welding device for gripping and holding an electrode, said device including a handle grip of heat and electrical insulating material attached to the current conducting member by means connecting the said handle grip from the under or inside thereof, said means terminating short of the exterior or outer faces of said grip, about which the hand of the operator is positioned, thereby preventing the possibility of shock.

Another object of the present invention is to provide a welding device including a tool formed of copper for conducting the electrical current and holding the electrode, a hand grip of heat and electrical insulating material for said tool, and means for detachably connecting an electric conductor to said tool.

A further object of this invention is to provide resilient means for normally holding the electrode gripping jaws firmly in contact with the electrode, but still provide an easier operating tool and one in which greater leverage is obtained with less effort on the part of an operator thereof.

With the above and other objects in view, the invention further consists in the construction and arrangement of the several parts hereinafter described and pointed out in the claims.

In the drawings, in which similar characters of reference designate similar parts in the several views.

Figure 1:
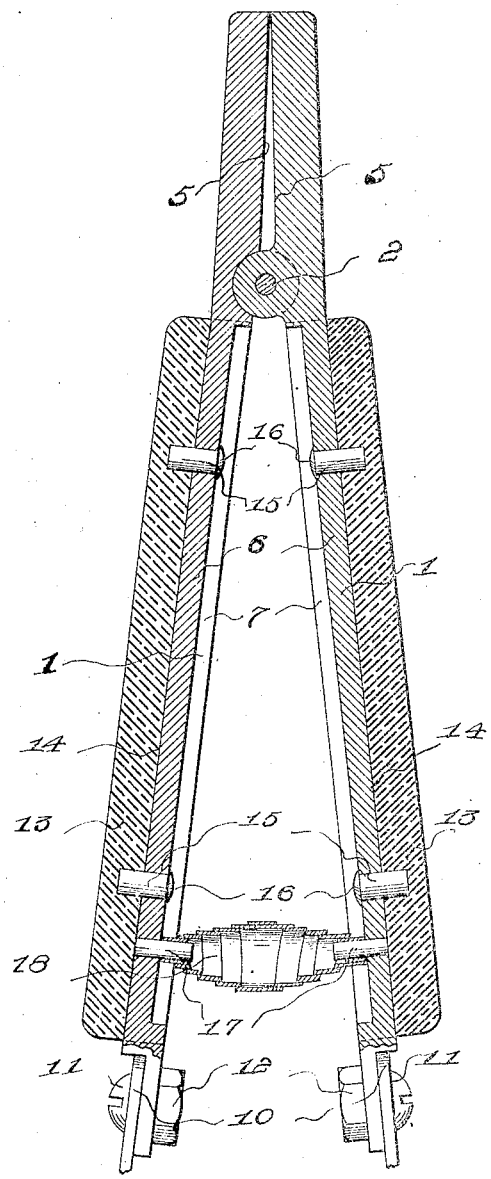
Figure 1 is a vertical sectional view of the tool of the present invention.
Figure 2:
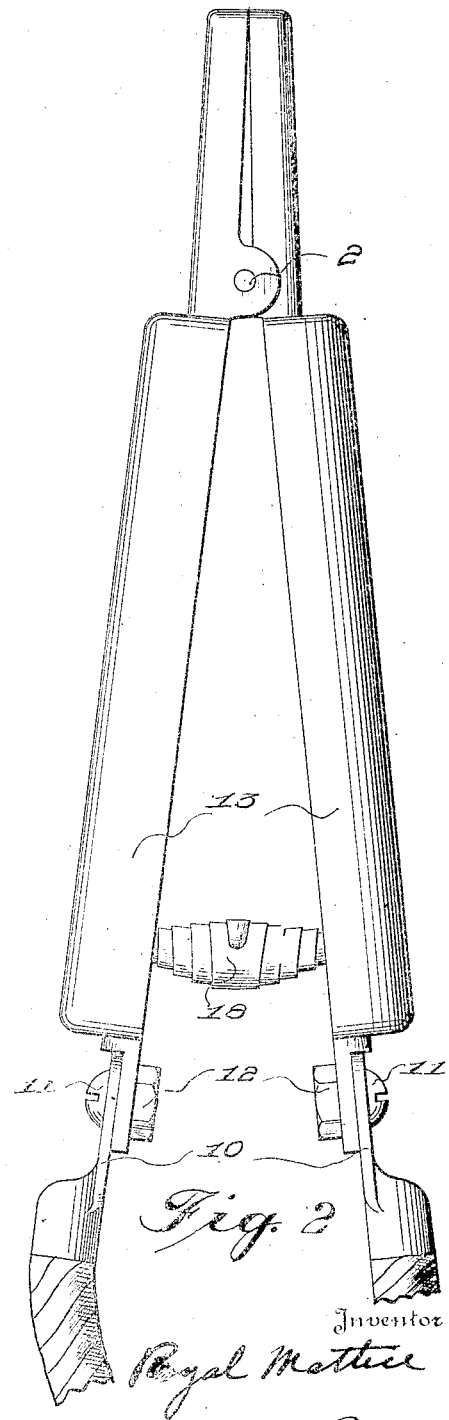
Fig. 2 is a view of the welding tool in side elevation, showing also, the ends of the conductors attached thereto.

Referring now, more particularly to the drawings, the welding tool of the present invention includes a handle portion provided with a heat and electrical insulating grip, an electrode holding device at one end thereof, and means for easily and rapidly attaching an electrical conductor to the other end of the tool.

The tool of the present invention is in the form of a pair of tongs consisting of two current conducting members 1—1, pivotally connected together by the pin 2. The current conducting members are of relatively tough and durable metal capable of withstanding the welding heat and are also good conductors of the electric current, said members being formed preferably of copper and offering little resistance to the flow of the current therethrough.

Each current conducting member comprises a jaw portion, the gripping face of which is smooth and unmutilated as indicated at 5, and a shank portion 6 provided in the end or inner face thereof with a longitudinally and centrally located groove 7. The end of the shank 6 is slightly reduced as shown and is provided with an opening through which and the metal end 10 of the current conductor, passes a bolt 11. which is of the usual construction and which secures the conductor to the device by means of a nut shown. It will be obvious that a detachable connection of the construction described has been found to materially increase the effectiveness of the tool, the long delays incident to the breaking of permanently attached conductors being obviated.

The current conducting members of the tool are each provided with a hand grip 13, said grip being formed of a heat and electrical insulating material. As shown, the hand grips 13 substantially surround the current conducting members 1, that is, the portions of said members 1 which would be exposed to possible contact during the use of the tool. The interior faces of the grips 13 contact with the outer face of the current conducting members 1 as shown at 14. If desired, an air space formed between the inner face of the hand grip and a longitudinal flattened portion of the current conducting members 1 may be provided, this air space being located intermediate the hand grip 13 and the current conducting member and at points principally covered by the hand of the operator when grasping the tool. The air space may be relatively large and located longitudinally and centrally of the hand grip and thus provide an effective means for preventing the conducting of the welding heat to the hand of the operator.

The means for attaching the hand grips 13 to the metal current conducting members 1 may be either screws or rivets, the latter being shown at 15. These rivets are inserted from the under or inner side of members 1 and are provided with heads 16 and their shanks extend into the handle grips but terminate short of the outer faces thereof in order that no conducting elements may be present on the exterior surface of the hand grips, for an obvious reason.

So far, the tool of this invention is substantially old as shown in patent to Mattice 1,419,744 of June 13, 1922 and the present invention contemplates certain improvements shown in said patent. It has been found in practice that a tool constructed in accordance with the aforesaid patent is difficult to operate for the reason that the elongated spring 8, while firmly holding the jaw portions together, compels the operator to use excessive strength in forcing the jaw portions apart to remove the remnants of an electrode or to insert a new electrode.

It is therefore an object of the present invention to provide means which will accomplish a far more satisfactory operation of the tool with much less effort on the part of an operator. To this end, there is provided near the rear end of each of the conducting members, a guide pin 17 and positioned between these conducting members and supported by these guide pins 7 is a double acting expansible spring 18. This spring 18 serves to force the conducting members 1 away from each other and thus maintain the jaw portions in contact with each other.

It will be obvious that a far greater leverage is obtained by the use of a spring such as that shown at 18 than is possible with the V-shaped type of springs now in present day usage.

It will further be obvious that by using a spring of the present invention any tendency of the spring burning out is eliminated because of the fact that the spring itself is positioned so far back of the hot point of the welding tongs. This is a disadvantage present in the use of a V-shaped spring which, after considerable use, burns out at the apex thereof, that is, where the spring is bent back upon itself.

Having thus described the invention, the particular features of novelty will be pointed out in the appended claims but I desire it understood that various changes in the form of the device may be made such as fall within the scope of said claims without departing from the spirit of the invention.

What I claim as my invention and desire to secure by Letters Patent is:

1. Welding tongs comprising two members pivoted to each other at a point intermediate their ends, and a telescopic spring connected to said members on one side of said pivot and normally urging the portions of the members on the other side of said pivot toward each other.

2. Welding tongs comprising two members pivoted to each other at a point intermediate their ends, and a spring having overlapping coil portions connected to said members on one side of said pivot and normally urging the portions of the members on the other side of the pivot toward each other.

3. Welding tongs comprising two members pivoted to each other at a point intermediate their ends, and a telescopic spring connected to said members on one side of said pivot near the rear ends of said members and normally urging the portions of the members on the other side of the pivot toward each other.

4. Welding tongs comprising pivoted members defining jaw portions and handle portions, and a telescopic spring having overlapping portions connected to said handle portions near the rear ends thereof and normally urging said jaw portions toward each other.

5. Welding tongs comprising pivoted members defining jaw portions and handle portions, and a spring connected to said handle portions adjacent the rear ends thereof and having its coils overlapping to define a substantially continuous telescopic outer surface whereby the greater portions of said coils are protected against heat and foreign matter.

6. Welding tongs comprising pivoted members defining jaw portions and handle portions, and a spring connected to said handle portions adjacent the rear ends thereof to normally urge the jaw portions toward each other, with the coils of said spring overlapping to define a substantially continuous telescopic outer surface whereby the greater portions of said spring are protected against heat and foreign matter.

In testimony whereof I hereby affix my signature.

ROYAL MATTICE.